Figure 4:
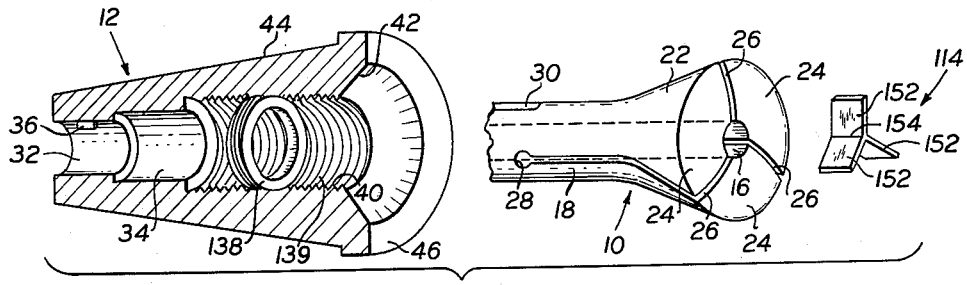

June 26, 1962  A. LAWALL ET AL  3,041,078
STOCK STOP FOR COLLETS
Filed Dec. 14, 1959  2 Sheets-Sheet 1
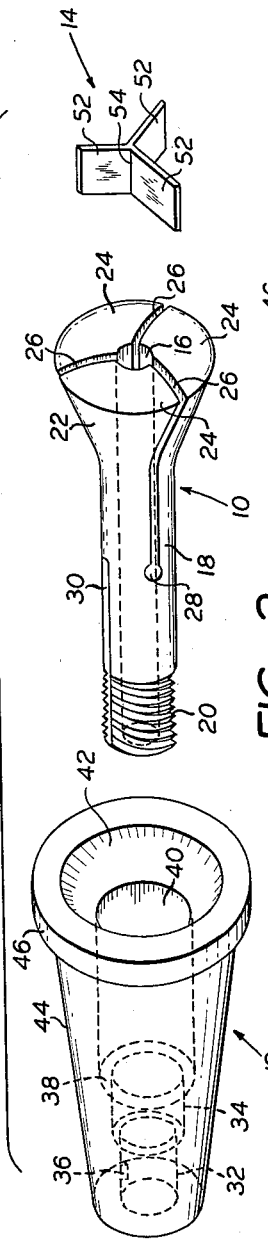
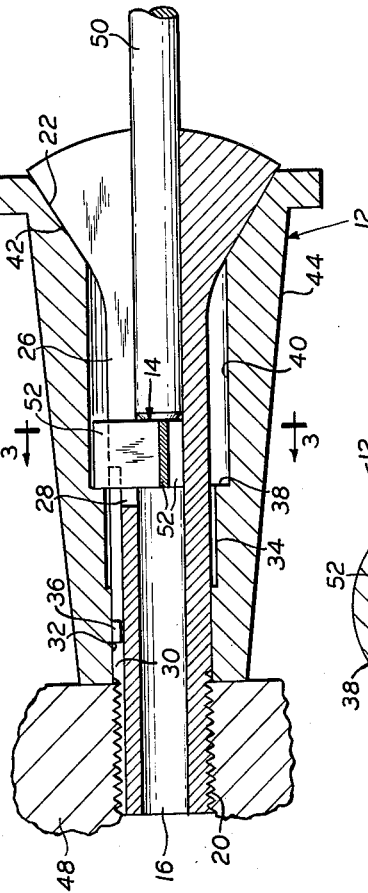
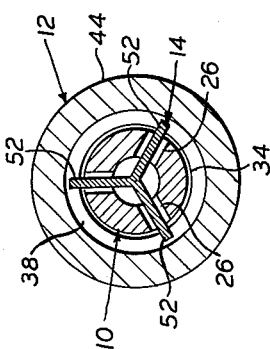
INVENTORS
ADAM LAWALL
GEORGE SORSA
BY
*Jerome Bauer*
ATTORNEY.

INVENTORS
ADAM LAWALL
GEORGE SORSA
BY
Jerome Bauer
ATTORNEY.

United States Patent Office 3,041,078
Patented June 26, 1962

3,041,078
STOCK STOP FOR COLLETS
Adam Lawall, Valley Stream, and George Sorsa, Huntington Station, N.Y., assignors to Robert E. Curran, Huntington, N.Y.
Filed Dec. 14, 1959, Ser. No. 859,365
15 Claims. (Cl. 279—51)

This invention relates to collets of the types commonly employed in lathes and other similar machines. More particularly the invention relates to improvements that will permit the insertion of a workpiece into the collet of the lathe or machine consistently for a predetermined distance of its length and that each insertion of the workpiece will be the same as every preceding or subsequent insertion until a desired change is deliberately made.

When working on or machining workpieces, all of which are to be of equal length, it is important that each of the workpieces be inserted into the machine consistently to the same depth or length. Various attempts have been made to consistently control or limit the predetermined length of such insertion of the workpiece. Examples of such devices are disclosed in United States Letters Patent Numbers 2,771,297, 2,650,098 and 2,502,719.

The prior art as exemplified by the aforementioned patents recognizes the problem of consistently limiting the insertion of the workpiece into the machine for a predetermined length thereof; however, the problem is not solved by the prior art that has physically connected or founded the limiting or work stopping structures on the collet itself. Such physical connections have compounded the problem and the effects thereof, for in the operation of the collet in a lathe or other similar machine, the collet is threadedly secured to the spindle of the machine. In order to cause the fingers of the collet to engage about the workpiece inserted thereinto, it is generally the practice to move the spindle and the collet axially in the machine. This collet movement has the effect of overcoming the operation of the workpiece stop mechanism physically connected for movement therewith so that each insertion of the workpiece into the lathe or machine is non-uniform with each preceding or subsequent insertion, in spite of the accuracy of the stopping mechanisms employed.

The objects and purposes of the present invention are to assure that each insertion of the workpiece into the machine will be uniform with each preceding and subsequent insertion.

It is another object of the invention to provide a workpiece stop for use in connection with commonly known collets to accurately limit each insertion of the workpiece into the machine to the same predetermined length thereof.

Another object of the invention is to provide a unique and novel arrangement of workpiece stop structure that is inexpensive to manufacture, extremely simple to use and yet efficient in operation.

Still another object of the invention is to provide a workpiece stop that may be varied predeterminately to vary the extent to which each insertion of the workpiece will be made into the lathe or machine.

Accordingly, it is a feature of the invention to provide a workpiece stop for use with commonly known collets which relies not upon the operation or movements of the collet, but rather on a stationary element that has no movement with respect to the workpiece thereby enabling the stop structure to consistently limit the depth of each insertion of the workpiece into the lathe or machine to a predetermined length.

Figure 5:
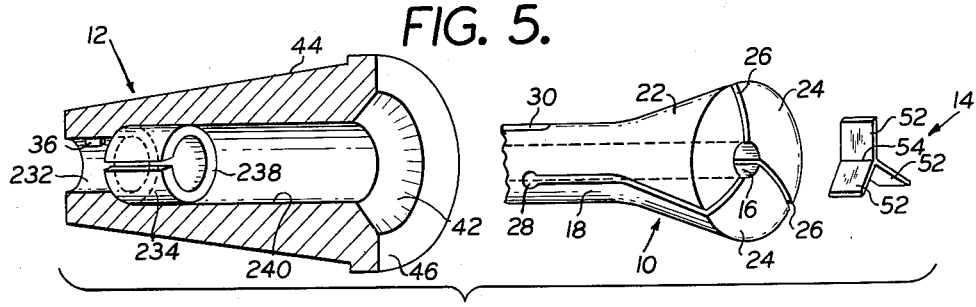
Figure 6:
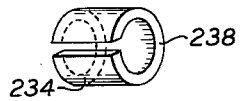
Figure 7:
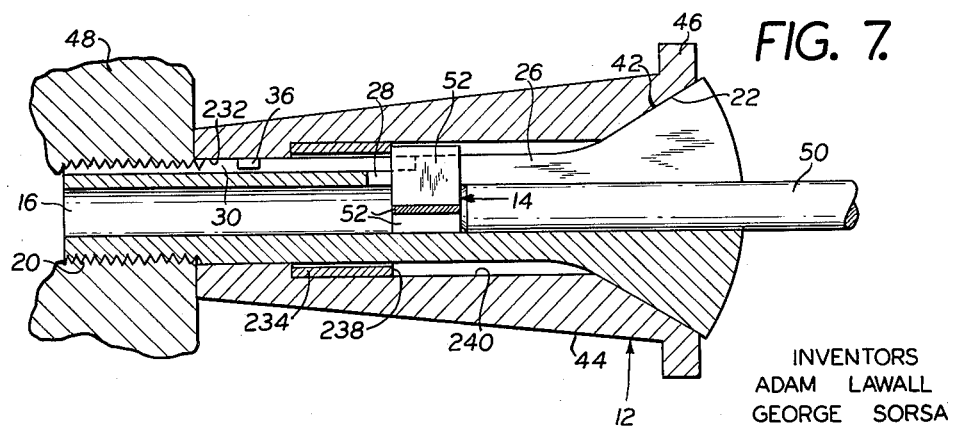

Other and further objects of my invention reside in the structures and arrangements hereinafter more fully described with reference to the accompanying drawings in which:

FIG. 1 is an exploded perspective view of the work stop showing the elements thereof constructed in accordance with the teaching of the invention, FIG. 2 is a sectional view of the assembled workpiece stop, FIG. 3 is a section of FIG. 2 taken in the direction of lines 3—3 of FIG. 2, FIG. 4 is a sectioned exploded perspective view of an embodiment of the invention, FIG. 5 is a sectioned exploded perspective view of another embodiment of the invention, FIG. 6 is a perspective view of the removable abutment shoulder of the embodiment shown in FIG. 5, and FIG. 7 is a sectional view of the assembled workpiece stop embodiment shown in FIG. 5.

Referring now to FIGS. 1 to 3 inclusive of the drawings, the workpiece stop structure comprises a collet generally identified by the numeral 10, a sleeve for the collet generally identified by the numeral 12, and a stop member generally identified by the numeral 14. The collet 10 illustrated in the figures of the drawing is of any well-known construction and generally comprises an axially directed centrally disposed opening 16 defined therein and extending for the full length thereof.

The collet body 18 is circular in shape and terminates at the rear end thereof in an exterior threaded surface 20 that is adapted to be threadedly connected with a mating thread in the spindle of the lathe or machine with which the present device is intended to be employed. It is the thread 20 that secures the collet to the spindle in the lathe or other machine and thus connects the collet with the spindle for corresponding axial movement therewith.

The forward or workpiece receiving end of the collet 10 terminates in an enlarged head having a tapering exterior surface 22. The enlarged head 22 and a lengthwise portion of the collet body 18 are slotted at 26 to divide the same into a plurality of resilient fingers 24. Each of the axially directed slots 26 terminate in enlarged or round holes 28 that extend through the body 18 into the central axial opening 16. Defined lengthwise along a rear portion of the body 18 and the threads 20 is a keyway 30.

The collet 10 is adapted to be assembled axially within the sleeve 12 with its rear threaded portion 20 extending beyond the rear end thereof. Consequently, the length of the sleeve is slightly shorter than that of the collet 10 received therein. Sleeve 12 is provided with an axially directed centrally disposed opening that has a plurality of stepped circularly shaped surfaces, to be described. The rear-most interior circular surface identified by the numeral 32 is termed a collet bearing surface because it is adapted to bearingly engage about the rear portion of the body 18 of the collet 10 to provide a support therefor.

Disposed adjacent to the bearing surface 32 is another circular surface 34 but slightly larger in diameter as to be free of engagement with the body 18 of the collet 10. However, provided on the surface 32 is a locking key 36 that is adapted to be received in the length of the axial keyway 30 of the collet 10 to permit relative axial movement of the collet within the sleeve 12, but to prevent relative rotation therebetween. Circular surface 34 terminates in a limiting abutment shoulder means 38 that is radially directed and defines the rear of an enlarged axial opening 40. The forward end of the opening 40 is tapered or inclined outwardly at 42 to coincide for mating cooperation with the enlarged tapered exteriors 22 of the collet 10. The exterior of the sleeve 12 is substantially conical and tapers rearwardly as shown at 44 while the forward end thereof assumes the form of an enlarged annulus 46 that rings or surrounds the taper 42.

In actual practice the collet 10 is moved axially into the sleeve 12 by first inserting its rear end threaded portion 20 through the opening 40 into the intermediate sized opening 34 and then into the smaller opening 32. Upon entry in the opening 32, the keyway 30 of the collet 10 is aligned with the key 36 of the sleeve 12 to permit the key to fit smoothly within the keyway as the continued rearward movement of the collet projects its threaded end 20 through the rear of the bearing surface 32 and beyond the rear of the sleeve. The rearward movement of the collet 10 in the sleeve is halted by the surfaces 22 engaging the surface 42. Thus, the wall of bearing surface 32 remains in bearing engagement with the rear portion of the body 18 of the collet while the threaded portion 20 is subsequently engaged with the mating threads of a spindle 48 of a lathe or similar machine.

In practice the sleeve 12 is forced into tight-fit engagement with a portion of the lathe or similar machine having an interior axial bore (not shown) that is provided with an interior taper corresponding to the taper of the exterior surface 44 of the sleeve. The sleeve is thus force-fit into the lathe or machine with its annulus 46 extending annularly about the face portion of the machine. The force-fit engagement of the sleeve 12 with that of the machine or lathe prevents the sleeve from moving either axially or rotatably relative to the machine; hence, the sleeve remains absolutely stationary.

When assembled as previously described, a workpiece 50 is adapted to be inserted into the axial opening 16 of the collet through the forward end thereof. In order to insure that each lengthwise insertion of the workpiece into the lathe or machine will be consistent, stop member 14 is provided. Stop member 14 comprises a plurality of diverging arms 52 that are connected together at their inside ends at 54 and radiate outwardly from their connection for a distance less than the radius of the axial opening 40 of the sleeve 12. In this way the stop member 14 may be moved axially into the sleeve and accommodated in the opening 40 thereof for abutment with the terminating shoulder 38.

The connecting portion 54 of the stop member 14 may be of any desired or predetermined length. The angular relationship between its arms 52 corresponds with that of the slots 26 to position its connecting portion 54 substantially centrally within the axial opening 16 of the collet. This is accomplished by sliding the stop member 14 axially into the collet opening 16 with the divergent arms 52 thereof moving along the lengths of the slots 26 between the collet fingers 24. When the collet 10 is positioned within the sleeve 12 and threadedly engaged with the spindle 48 as shown in FIG. 2, the continued movement of the stop member 14 into the collet is subsequently limited by its arms 52 coming into abutting limiting engagement with the radially disposed shoulder 38 of the sleeve.

It will be noted that when the stop member 14 is limited in its axial movement into the collet 10 by engagement with the shoulder 38, it is spaced from the rear ends 28 of the slots 26 in which the arms 52 thereof ride. Hence, the stop member 14 is substantially free of the collet 10 and is not in any way affected by the axial movement of the collet 10 responding to the operation of the spindle 48 in which it is threaded. Accordingly, by predeterminately positioning the abutment shoulder 38 along the axial length of the sleeve 12, and by providing a stop member 14 having a connection portion 54 of a predetermined length for cooperation with the shoulder means, the extent to which the workpiece 50 may be inserted into the collet for engagement by the resilient fingers 24 thereof may be predetermined.

By knowing the location of the shoulder 38 formed integral with the sleeve so that it is fixed from movement thereon, one is able to provide a stop member 14 having a connection portion 54 that is of predetermined length and, therefore, the operator of the lathe or machine may readily determine the extent or the length of the workpiece 50 that will be inserted into the collet for engagement between the fingers thereof. Hence, when the collet is moved axially rearward within the sleeve 12 by the pulling force applied thereto by the spindle 48, the stop member 14 will remain in stationary engagement with the abutment shoulder 38. It will operate independently of the movement of the collet to limit the depth of insertion of the workpiece 50 thereinto even while the fingers 24 of the collet are resiliently closed about the workpiece as a result of the relative axial movement occurring between the tapered surfaces 22 and 42 of the collet and sleeve respectively.

It will be recognized that because the stop member 14 cooperates with the stationary abutment shoulder 38 on the stationary sleeve 12, its operation remains unaffected by the axial movements of the collet 10. In like manner the workpiece 50 will be consistently inserted into the machine or lathe 10 for the same predetermined distance or lengthwise extent thereof for each and every insertion irrespective of the movement of the collet member. It will be recognized that the thickness of the stop arms 52 is substantially less than the width of the slots 26 that form spaces between the engaging fingers 24 so that they will not hinder or interfere with the contraction of the fingers as they are closed about the workpiece.

The embodiment disclosed in FIG. 4 is substantially the same as that disclosed in FIGS. 1 to 3 inclusive. It differs therefrom, however, in the provision of an adjustable mechanism that permits varied adjustment or positioning of the stop member 14 within the collet 10. Thus, in the prior described embodiment shown in FIGS. 1 to 3 inclusive, in order to vary the length of the insertion of the workpiece 50 into the collet and the lathe or machine with which it is connected, it is necessary to provide stop members having connecting portions 54 thereof that are of different desired or predetermined lengths.

In the present embodiment of FIG. 4, it is necessary only to provide one stop member 114 having a connection portion 154 thereof that is of a fixed and predetermined length. However, by threadedly moving the abutment shoulder means 138 along the cooperating interior thread 139 of the opening 40 of the spindle 12, it is possible to adjustably vary the location or position of the stop member 114 along or relative to the axial extent of the opening 16 of the collet 10.

Hence, the present embodiment operates in substantially the same manner as the embodiment described with respect to FIGS. 1 to 3 inclusive and for that reason, therefore, structural parts of the instant embodiment are provided with numbers corresponding to like parts of the prior described embodiment. Since the operation of the present embodiment is exactly the same as that previously described, except for the aforementioned adjustable abutment means 138, a repetition of such description would be superfluous.

The embodiment shown in FIGS. 5 to 7 is also substantially the same as that disclosed in FIGS. 1 to 3 and for that reason, like numerals are employed to indicate like elements of structure. Where, however, there is a change in the elemental structure of the present embodiment from that disclosed in FIGS. 1 to 3, related elements are numbered in the 200 series with the suffix or tens digits corresponding to that of FIGS. 1 to 3.

The embodiment disclosed in FIGS. 1 to 3 comprises an abutment shoulder means 38 that is predeterminately positioned along the length of the interior of the sleeve 12. Such shoulder serves to provide a limitation to the rearward movement of the stop member 14 thereinto. In such aforementioned embodiment, the shoulder 38 is formed as an integral configuration of the sleeve delineating the extent of the openings 40 and 34.

In the instant embodiment of FIGS. 5, 6 and 7, an abutment shoulder means 238 is provided by an end wall of a resilient split ring-shaped abutment member 234. The abutment member 234 is slotted longitudinally along its length to form the ring in a C-shape that is resiliently contractible to fit snugly within the elongated axial opening 240. The member 234 abuts against the adjacent inner shoulder of the bearing surface 32 which may be likened to the bearing surface 32 of the embodiment shown in FIGS. 1 to 3.

Hence, the member 234 performs the same function as the surface of the opening 34 of the embodiment shown in FIGS. 1 to 3. However, because the member 234 is removable from within the opening 240 of the sleeve 12, it can be made of any predetermined length. Therefore, rather than providing stop members 14 of different lengths for use in the embodiment shown in FIGS. 1 to 3, the ring-shaped member 234 may be conveniently provided in any desired length to take the place of or be substituted for the walls of the opening 34 thereof.

The member 234 thus eliminates the need to provide the surface opening 34 of the embodiment shown in FIGS. 1 to 3 and permits a further advantage of being able to provide members 234 of various lengths whereby their ends form an abutment surface 238 that may be variably located within the opening 240 of the sleeve for engagement by the stop member 14. The resilience of the member 234 enables it to be squeeze whereby its diameter may be reduced to permit the same to be inserted easily and quickly into the opening 240. However, when properly positioned therein against the shoulder of the bearing surface 32, it will snugly engage the circular adjacent wall of the opening 240 to prevent its accidental removal therefrom. The interior diameter of the member 234, when positioned within the opening 240, will be substantially equal to the interior diameter of the shoulder 34 of the embodiment disclosed in FIGS. 1 to 3 thereby being free from restrictive engagement with the collet 10 that is inserted thereinto.

It is also important to note that certain sleeves 12 commonly in use on lathes and like machines are provided only with the collet bearing surface 32. The use of the C-shaped limiting spring member 234 thus makes it unnecessary to rework the prior sleeves to provide the intermediate stepped opening 34 (FIGS. 1 to 3). Instead, the spring member 234 may be easily employed therein to make it adaptable for use with the stop member 14. On the other hand, new sleeves 12 that are manufactured can be made with the stepped wall 34 (FIGS. 1 to 3).

Quite obviously those sleeves (FIGS. 1 to 3) having the stepped wall 34 formed as an integral part thereof still can utilize the members 234 when it is desired to extend the axial length of the opening to vary the position of the shoulder 38. Because the member 234 is of substantially the same diameter as the wall of opening 34, it may be inserted into the sleeve and moved along the opening 40 until it abuts the fixed shoulder 38. Thereafter, the member 234 forms an extension of the opening 34 and its other free end becomes the abutment shoulder for engagement by the stop member 14.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

We claim:

1. A workpiece stop for a collet comprising the combination of a collet having a plurality of spaced fingers engageable with a workpiece to be inserted therebetween, a sleeve about said collet and in which said collet is relatively movable, a surface on and within said sleeve, and a stop member within said collet to limit the extent to which the workpiece may be inserted between said fingers and including means extending beyond and between adjacent ones of said fingers to abut said surface to prevent its movement with said collet relative to said sleeve.

2. A workpiece stop as in claim 1, said surface being formed integral with said sleeve and said sleeve being stationary.

3. A workpiece stop as in claim 1, said surface being connected with said sleeve for adjustment relative thereto to adjustably vary the position of said stop member in said collet.

4. A workpiece stop comprising a sleeve having an axially directed opening defined therein, a shoulder in said sleeve predeterminately positioned along the length of said opening, a collet movable in said sleeve and adapted to receive a workpiece therein, said collet having a plurality of fingers spaced from each other and being adapted to engage with the workpiece received therein, and a stop member within said collet and having a plurality of arms each connected with the other and passing between said spaced fingers in engagement with said shoulder and to provide a stop for the workpiece to limit the extent to which the same is received in said collet.

5. A workpiece stop comprising a collet having a central axial opening defined therein and into which a workpiece is adapted to be moved for a predetermined portion of its length, said collet having a plurality of axial slots defining a plurality of resilient fingers each adapted to be radially contracted into engagement with said predetermined portion of the workpiece moved into said collet, a stop member of predetermined length adapted to be received in said axial opening in said collet, said stop member having a plurality of arms connected together at one end thereof and radiating outwardly to pass through one of said slots and beyond a respective one of said resilient fingers, said connection of said arms being positioned in said axial opening to obstruct the same and the movement of the workpiece thereinto to said predetermined portion of its length, and a sleeve having means therein engaged by said arms to limit the axial receipt of said stop member in said collet.

6. A workpiece stop as in claim 5, said sleeve being stationary and said means thereon being an interior radially directed surface predeterminately positioned with respect to said collet to position said stop member in said collet along a predetermined portion of said axial opening thereof.

7. A workpiece as in claim 5, said sleeve being stationary and said collet being axially movable therein, said means on said sleeve being interiorly threaded thereon for adjustment therealong for predetermined positioning relative to said collet to adjustably vary the position of said stop member in said collet axial opening.

8. A workpiece as in claim 5, said sleeve means including a resilient radially biasable member removably engageable with said sleeve and having said means therein engageable by said arms.

9. A workpiece stop comprising the combination of a collet member having an axial opening defined therein to receive a workpiece, a plurality of spaced fingers on said collet to engage the workpiece and retain the same in said axial opening, a stationary sleeve having an axial opening in which said collet is relatively axially movable, cooperating engaging means on said collet and sleeve to guide said collet for said relative axial movement in said sleeve and to prevent relative rotative movement therebetween, said sleeve having a radially directed surface predeterminately positioned along the length of its axial opening, and a stop member having a plurality of connected stop arms, said arms radiating outwardly from their connection with each other and extending between and beyond said spaced fingers for axial abutment with said surface, said connection of said arms being positioned in said axial opening of said collet and being of a predetermined length to limit the length of the workpiece received in said collet opening.

10. A stationary sleeve having an axial opening therein and shoulder means predeterminately positioned along the length of said opening, a collet having a plurality of spaced resilient fingers, said collet being in said opening of said sleeve and being axially movable relative to said sleeve, a workpiece receiving opening in said collet, and means of predetermined length adapted to be received in said collet opening to obstruct the same and including arms of fixed length extending beyond and between said fingers for engagement with said shoulder means to limit its axial movement independently of the axial movement of said collet.

11. A workpiece stop comprising a collet member having a plurality of spaced fingers adapted to receive and engage a workpiece inserted therebetween, a sleeve having an axial opening therein in which said collet is axially movable relative thereto, stationary abutment means in said opening of said sleeve, and a stop member in said collet obstructing the insertion of the workpiece between said fingers to a predetermined length thereof, said stop member including means extending radially beyond and between adjacent ones of said fingers and cooperating with said abutment means to remain stationary therewith during the axial movement of said collet in said sleeve.

12. A workpiece stop comprising a sleeve having an axial opening therein and abutment means on said sleeve adjustable along the length of said axial opening, a collet having a plurality of spaced fingers for receipt of a workpiece therebetween and for engagement therewith, said collet having axial movement in said axial opening of said sleeve, and a stop member in said collet cooperable with said abutment means and adjustable thereby to be variably positioned in said collet to limit the extent of the workpiece to be received between said collet fingers.

13. A workpiece stop comprising a sleeve having an axial opening therein, an abutment member in said sleeve opening, said member having abutment means thereon, a collet having a plurality of spaced fingers to receive a workpiece therebetween for engagement therewith, said collet being axially movable in said opening of said sleeve, and a stop member in said collet including means extending radially beyond and between adjacent ones of said spaced fingers and cooperable with said abutment means to limit the extent of receipt of the workpiece between the fingers of said collet.

14. A workpiece stop as in claim 13, said abutment member being C-shaped and radially biasable for insertion into said sleeve opening for engagement therewith and for disengagement and removal therefrom, said member being of a predetermined length to limit the axial movement of said stop member into said sleeve.

15. A workpiece stop for a collet comprising the combination of a collet having a plurality of spaced fingers engageable with a workpiece to be inserted therebetween, a sleeve about said collet and in which said collet is relatively movable, a surface on and within said sleeve, a resilient member movable into said sleeve and engageable therewith for positioning about but radially spaced from said collet, said resilient member having an abutment surface, and a stop member within said collet to limit the extent to which the workpiece may be inserted between said fingers and including means extending beyond and radially between said fingers to abut said abutment surface to prevent its movement with said collet relative to said sleeve.

References Cited in the file of this patent

UNITED STATES PATENTS

| | | |
|---|---|---|
| 1,428,100 | Kahl | Sept. 5, 1922 |
| 2,469,160 | Evans | May 3, 1949 |
| 2,491,167 | Drew | Dec. 13, 1949 |
| 2,842,371 | Kersten | July 8, 1958 |
| 2,871,023 | McCormick | Jan. 27, 1959 |
| 2,922,656 | Belloli | Jan. 26, 1960 |

FOREIGN PATENTS

| | | |
|---|---|---|
| 808,787 | Great Britain | Feb. 11, 1959 |